United States Patent

Long et al.

Patent Number: 5,985,178
Date of Patent: Nov. 16, 1999

[54] LOW HYDROGEN SYNGAS USING $CO_2$ AND A NICKEL CATALYST

[75] Inventors: David C. Long, Baton Rouge, La.; Rocco A. Fiato, Basking Ridge, N.J.

[73] Assignee: Exxon Research and Engineering Co., Florham Park, N.J.

[21] Appl. No.: 08/961,814

[22] Filed: Oct. 31, 1997

[51] Int. Cl.[6] .................................................. C07C 1/02
[52] U.S. Cl. ............................................................ 252/373
[58] Field of Search ............................................. 252/373

[56] References Cited

U.S. PATENT DOCUMENTS

| | | | |
|---|---|---|---|
| 4,877,550 | 10/1989 | Goetsch et al. | 252/373 |
| 4,888,131 | 12/1989 | Goetsch et al. | 252/373 |
| 5,143,647 | 9/1992 | Say et al. | 252/373 |
| 5,160,456 | 11/1992 | Lahn et al. | 252/373 |
| 5,421,840 | 6/1995 | Taylor et al. | 48/198.6 |

FOREIGN PATENT DOCUMENTS

| | | |
|---|---|---|
| 0335668 | 10/1989 | European Pat. Off. . |
| 0673877 | 9/1995 | European Pat. Off. . |
| 0700866 | 3/1996 | European Pat. Off. . |
| 0367654 | 5/1990 | France . |
| 2179366 | 3/1987 | United Kingdom . |
| 2240284 | 7/1991 | United Kingdom ............. B01J 23/40 |
| 2274284 | 7/1994 | United Kingdom . |
| 9211199 | 7/1992 | WIPO ............................. C01B 3/40 |

*Primary Examiner*—Paul J. Killos
*Assistant Examiner*—J. Parsa
*Attorney, Agent, or Firm*—Jay Simon

[57] ABSTRACT

A process for making a synthesis gas comprising $H_2$ and CO in the presence of a reforming catalyst comprising a supported non-noble Group VIII metal catalytic component from a feed including a low molecular weight alkane, and preferably methane as in natural gas, $O_2$, $H_2O$ and $CO_2$ without catalyst deactivation is achieved by partially oxidizing and steam reforming the feed in the presence of the catalyst. The feed $H_2O$ to hydrocarbon carbon mole ratio is less than 2. The mole ratio of the combined feed $CO_2$ and $H_2O$ to hydrocarbon carbon ranges from 0.5–2.5 and that of the feed $H_2O$ to $CO_2$ ranges from 0.35–6. Synthesis gas having $H_2$ to CO mole ratios less than 2:1 and even less than 1.5:1 are easily achieved with net $CO_2$ consumption, which also makes the process environmentally beneficial.

12 Claims, No Drawings

LOW HYDROGEN SYNGAS USING $CO_2$ AND A NICKEL CATALYST

BACKGROUND OF THE DISCLOSURE

FIELD OF THE INVENTION

The invention relates to producing a syngas having a hydrogen to carbon monoxide ratio less than two by partial oxidation and reforming using carbon dioxide. More particularly, the invention relates to producing a syngas mixture having an $H_2$ to CO mole ratio of less than two from a feed comprising a hydrocarbon, oxygen, $CO_2$ and steam by a combination of partial oxidation and catalytic reforming in a fluid bed containing a Group VIII catalyst, such as nickel, without coking the catalyst.

BACKGROUND OF THE INVENTION

Synthesis gas (syngas) comprises a mixture of $H_2$ and $CO_2$ and is used for various purposes, including synthesis of hydrocarbons and oxygenates. While syngas may be derived by the partial oxidation of a variety of hydrocarbonaceous feed materials such as coal, tar, coke, hydrocarbons and the like, it is convenient to form it from low molecular weight hydrocarbons, preferably alkanes and most preferably methane, as in natural gas. In converting natural gas or other gaseous hydrocarbon feed liquid hydrocarbons, the gas is typically reacted with oxygen and steam to form the syngas which then serves as the feed for subsequent synthesis operations. When used for hydrocarbon synthesis with a non-shifting catalyst, the syngas typically has an $H_2$ to CO mole ratio of about 2:1. When making either hydrocarbons with a shifting catalyst or when making methanol and higher alcohols, aldehydes, acetic acid, dimethyl ether and other chemicals, syngas having $H_2$ to CO mole ratios of less than 2:1 and closer to 1:1 are needed. Syngas production from natural gas or low molecular weight hydrocarbons is accomplished by processes which include partial oxidation, catalytic steam reforming, water gas shift reaction and combination thereof, in which the catalyst can be in either a fixed bed or fluidized bed. These syngas processes and their relative merits are discussed, for example, in U.S. Pat. No. 4,877,550; 4,888,131 and 5,160,456. Autothermal reforming and fluid bed syngas generation (FBSG) processes employ partial oxidation with catalytic steam reforming, with FBSG having the advantage of superior heat and mass transfer. In contrast to autothermal reforming, which has separate partial oxidation and steam reforming zones, in FBSG the partial oxidation and reforming both occur in the presence of the reforming catalyst. Both processes use a relatively inexpensive supported nickel catalyst.

It is known that adding $CO_2$ to the syngas feed will drive the shift reaction equilibrium towards the low hydrogen to CO ratios desired for chemicals synthesis ($CO+H_2O \Leftrightarrow CO_2+H_2$), but this quickly deactivates and cokes a nickel reforming catalyst. For example, British patent publication 2 240 284 discloses heavy coking of a nickel, but not a platinum, reforming catalyst in a fixed bed quartz tube reactor using an equimolar feed mixture of $CO_2$ and $CH_4$ with an $H_2$ to CO product mole ratio of 0.92. It also discloses that a nickel catalyst will coke if the mole ratio of $H_2O$ (steam) to total carbon is less than two. PCT patent publication WO 92/11199 discloses forming a syngas from a mixture of $CH_4$, $CO_2$ and $O_2$ with a noble metal catalyst and a nickel catalyst, with the nickel catalyst becoming completely coked within a few hours. In both of these publications the reactions were conducted at a very low pressure of about one atmosphere and it is known that higher pressures increase coke production. Adding large amounts of steam reduces the coking, but also reduces thermal efficiency, and by acting as a diluent, it reduces syngas production as reflected in less hydrocarbon feed conversion to syngas per volume of reactor. Since all natural gas has some $CO_2$ in it, using $CO_2$ as part of the syngas feed will reduce the amount of $CO_2$ which must normally be removed from the gas before it is feed into a syngas generator and net $CO_2$ consumption would be environmentally beneficial. It would be an improvement to the art if $CO_2$ could be used as part of the syngas feed without the drawbacks of reduced syngas production associated with a low pressure reactor, catalyst coking, or the need for highly expensive noble metal catalysts.

SUMMARY OF THE INVENTION

The invention relates to a process for producing a synthesis gas (syngas) comprising a mixture of $H_2$ and CO from a feed comprising $CO_2$ and a hydrocarbon, with net $CO_2$ consumption, using a combination of both partial oxidation and catalytic reforming in a fluid bed syngas generator (FBSG). The syngas will preferably have an $H_2$ to CO mole ratio of less than 2:1 and more preferably less than 1.5:1. In the process of the invention, feed components comprising a hydrocarbon, $CO_2$, $H_2O$ and $O_2$ in which the mole ratio of $H_2O$ to the carbon in the hydrocarbon component of the feed to the syngas generator is less than 2, are passed into an FBSG in which the hydrocarbon is partially oxidized and steam reformed in the presence of a reforming catalyst at conditions effective to convert the feed to the desired syngas. Effective conditions includes superatmospheric pressures and temperatures in excess of 1,000° F. The feed mole ratio of $CO_2$ plus $H_2O$ to the carbon in the hydrocarbon feed component [$(CO_2+H_2O)/C$] is greater than 0.5, with an $H_2O$ to $CO_2$ mole ratio of at least, and preferably greater than, 0.35. The $(CO_2+H_2O)/C$ feed mole ratio may range from about 0.5–2.5, preferably 0.6–2 and more preferably from about 0.7–1.8. The $H_2O$ to $CO_2$ mole ratio in the feed to the syngas generator will range from about 0.35–6, preferably 0.5–4 and more preferably 0.4–0.8 for a feed hydrocarbon comprising mostly methane. Finally, the mole ratio of the $H_2O$ to total carbon in the hydrocarbon component of the feed is preferably less than 1 and more preferably less than 0.5. The $(CO_2+H_2O)/C$ feed mole ratio refers to the number of moles of the combined $CO_2+H_2O$ per mole of carbon atoms in the hydrocarbon portion of the feed and does not include the carbon content of the $CO_2$. The number of moles of carbon atoms is obtained by adding together the number of moles of different hydrocarbons in the feed multiplied by the number of carbon atoms in the chemical formula of those compounds. Thus, one mole of methane corresponds to one mole of carbon and one mole of propane corresponds to three moles of carbon, etc. While the steam reforming catalyst useful in the process of the invention may comprise any one or more of the Group VIII metals as the catalytic metal component, the process of the invention permits the use of the less expensive, Group VIII non-noble metals, such as nickel. In the case of a catalyst in which nickel comprises the catalytic metal component, the syngas is produced according to the process of the invention without significant catalyst deactivation. By this is meant a catalyst deactivation rate of less than a 1 mole % loss of hydrocarbon conversion per day, preferably less than one-half mole % loss per day and still more preferably less than 0.1 mole % loss of hydrocarbon conversion per day. This process has been demonstrated to produce syngas having an $H_2$ to CO mole ratio as low as 1:1, at high pressures of over 30 atmospheres and temperatures in excess of 1500° F., in an FBSG containing a fluid bed comprising a nickel reforming catalyst, with no coking of the catalyst. The hydrocarbon feed component will typically comprises a low molecular weight hydrocarbon, preferably an alkane and more preferably mostly methane, as in natural gas, with minor amounts (e.g., up to about 20%) of $C_2+$hydrocarbons. However, the hydrocarbon component of the feed may also contain higher molecular weight hydrocarbons, aromatics and oxygenates, provided they are gaseous at the reaction conditions in the FBSG and do not contain heteroatoms, such as sulfur, nitrogen, metals and the like. Thus, while natural gas is preferred for the hydrocarbon component of the feed, the invention is not intended to be limited solely to the use of natural gas. The $CO_2$ may come from any convenient source, such as from the natural gas itself or from $CO_2$ rich tail gas from one or more hydrocarbon synthesis reactors. The process of the invention is also environmentally beneficial due to the net $CO_2$ consumption.

DETAILED DESCRIPTION

The production of syngas according to the process of the invention is achieved in an FBSG generator in the presence of a fluidized catalyst bed comprising a solid, particulate steam reforming catalyst under conditions of elevated temperature and pressure effective to convert the feed to the desired syngas. As is known to those skilled in the art, in an FBSG, both the partial oxidation and steam reforming take place in the presence of the fluidized catalyst particles, so that a catalyst free partial oxidation zone is not present as it is in, for example, an autothermal process such as that disclosed in U.S. Pat. No. 5,628,931. The oxygen (or air, although oxygen is preferred) and hydrocarbon are introduced into the reactor at different levels. Either or both the oxygen and hydrocarbon portion of the feed may contain one or more of $CO_2$ and $H_2O$, but the $O_2$ and hydrocarbon are not mixed before they are fed into the FBSG. A hot flame zone surrounds the oxygen at the points of oxygen injection in the fluidized bed. It is preferred that the hydrocarbon and $CO_2$ be introduced through a plurality of injection points into the bottom of the catalyst bed, with the oxygen and steam introduced through a plurality of injection points higher up in the bed, but with the vertical separation of the hydrocarbon and oxygen injection points not so great so as to lose the benefit of the oxidation on carbon removal from the fluidized catalyst. The actual distance will depend on the size, design and operating parameters of the FBSG. This idea of separate injection of the hydrocarbon and oxygen is known and disclosed, for example, in U.S. Pat. Nos. 4,877,550 and 5,588,974. The FBSG may comprise more than one reaction zones and more than one reaction vessel or reactor. This is known and is disclosed in the patents already referred to and also in U.S. Pat. No. 5,421,840. The fluidized bed will also preferably contain substantially inert, attrition resistant, solid, heat transfer particles such as alpha alumina which minimize catalyst particle agglomeration and permit the FBSG to operate at higher temperatures as is disclosed in the '456 patent referred to above. The conditions in the FBSG include pressures in the range of about 10–70 atmospheres, preferably 10–50 atmospheres and more preferably 20–50 atmospheres, while the temperature will typically range from about 1650° F. to about 2000° F. and preferably from about 1750° F. to about 1900° F. The practical upper limits of temperature and pressure are determined by the ability of the catalyst, reactor and heat transfer particles to withstand the higher temperatures and pressures. The catalyst includes at least one catalytic metal component of metal selected from Group VIII of the Periodic Table of the elements (Sargent-Welch Scientific Company© 1968), with or without the presence of one or more promoters selected from the group consisting essentially of rare earth metals, metals from Groups III–VI, and mixture thereof While the invention may be practiced with Group VII noble metals, the Group VIII non-noble metals are preferred and may be used in the practice of the invention with little or no loss in catalytic activity. Nickel is preferred due to its low cost, resistance to sulfur poisoning and catalytic effectiveness for the syngas generation. While any heat resistant and inert material will be useful as a catalyst support, heat resistant alpha alumina is preferred for most applications. Due to the high temperatures employed, the catalyst support is a heat resistant material, inert with respect to the catalytic component supported on it and inert with respect to the syngas feed components and reactions, as well as the materials in the syngas reactor. As is known to those skilled in the art, a high purity alpha alumina, typically stabilized with minor amounts (e.g., ~0.3 wt. %) of lanthana. The syngas is formed in the reactor by a combination of partial oxidation and catalytic steam reforming, both of which occur in the presence of the catalyst. While the nickel loading on a catalyst particle will range from between about 1 to 20 wt. %, when the fluidized bed also contains the inert heat transfer particles, the nickel loading in the bed will typically range from about 0.02 to 3 wt. % of the total weight of the particles constituting the bed. As mentioned above, while the hydrocarbon feed component will typically comprise a low molecular weight hydrocarbon, preferably an alkane and more preferably comprises mostly methane as in natural gas, with minor amounts (e.g., up to about 20%) of $C_2+$hydrocarbons, the practice of the invention is not intended to be so limited. A typical natural gas useful as a feed for syngas generation comprises, for example, mostly methane (>50%). nitrogen in an amount from about 0–15%, about 2–25% $C_2+$hydrocarbons, $CO_2$ in an amount of up to about 20%, and the remainder methane. Whatever the source of hydrocarbon for the FBSG feed, it is also important to remove sulfur compounds from the hydrocarbon by any of many known means before it is passed into the FBSG, as is known to those skilled in the art, to prevent either catalyst deactivation or loss of catalytic activity, depending on the catalytic metal components.

The invention will be further understood with reference to the example below.

EXAMPLE

In this experiment, a pilot plant size FBSG reactor containing a fluidized bed comprising a mixture of a particulate, supported nickel catalyst and particulate, inert heat transfer solids was used to produce the syngas. The catalyst contained about 8 wt. % nickel on a fused, 0.3 wt. % La-Alumina support. Both the catalyst support and heat transfer solids were a high purity (99%), attrition resistant alpha alumina. A mixture of natural gas comprising 97% methane, along with $CO_2$ and $H_2O$, was preheated and fed into the bottom of the fluidized bed reactor, flowing upward to fluidize the particulate solids. A mixture of oxygen, $H_2O$ and $CO_2$ was added separately to the reactor near the bottom, in which it reacted with the methane. The amount of $CO_2$ and steam in both feeds was adjusted to the desired overall concentration of these components in the FBSG. The operating pressure and temperature in the reactor were 400 psig. and 1 825° F. The total feed composition was varied as shown in the Table below. At first the reactor was operated for a period of more than a week using the total feed composition shown for the first condition in the Table below. Then the feed composition was adjusted to substantially decrease the $H_2O/CH_4$ mole ratio in the feed and increase the $CO_2/CH_4$ mole ratio as shown in the Table for run condition 2. The reactor ran for an additional 5 days at this feed ratio, before the data shown for run condition 2 were taken. After running like this for several days more, the $CO_2/CH_4$ mole ratio was increased to 0.48 and the $H_2O/CH_4$ mole ratio slightly decreased from 0.23 to 0.18 as shown in the Table for run condition 3. As shown for run 1, with the high $H_2O/CH_4$ mole ratio, instead of the $CO_2$ being converted, there was a net increase in the $CO_2$ the reactor (and in the effluent syngas) and the $H_2/CO$ mole ratio of the syngas produced under these conditions was 2.13:1. Bringing the $H_2O/CH_4$ mole ratio of the feed down to 0.23 resulted in a $CO_2$ conversion rate of 24%, with the $H_2/CO$ mole ratio of the syngas then down to a more desirable level of 1.3:1 in accordance with the object of the invention. Further decreasing the $H_2O/CH_4$ mole ratio of the feed permitted an increase in the total $CO_2$ content, with increased $CO_2$ conversion and the syngas having an $H_2/CO$ mole ratio of 1.17, as shown for run condition 3. Before these data were taken, the FBSG was operating continuously for over 50 days under various conditions and continued operating continuously while the feed was being changed and the data shown below were taken. The results in the Table are averages obtained under the reported conditions, of data taken each day for at least three days. All compositions and percents in the Table below are in terms of moles. The $H_2O/CO_2$ feed mole ratio for runs 1, 2, and 3 are 5.4, 0.7 and 0.4, respectively, while those for the $(CO_2+H_2O)/C$ were 1.47, 0.57 and 0.76. The −32.4 $CO_2$ conversion for run condition 1 means that instead of consumption of the feed $CO_2$, there was a net $CO_2$ production during the process in an amount of 32.4% of the $CO_2$ content of the feed. During the entire time the reactor was operating the nickel reforming catalyst maintained its catalytic activity, as evidenced by no loss in $CH_4$ conversion, thereby demonstrating the process of the invention. These data at the catalyst remained active (as measured by $CH_4$ conversion) over all the conditions shown in the Table.

| Syngas $H_2$ to CO Mole Ratio Based On Feed Composition | | | | | |
|---|---|---|---|---|---|
| Run | Total Feed Ratios | | | $CO_2$ | Syngas | $CH_4$ |
| Condition | $O_2/CH_4$ | $CO_2/CH_4$ | $H_2O/CH_4$ | Conversion, % | $H_2/CO$ | Conversion % |
| 1 | 0.6 | 0.23 | 1.24 | −32.4 | 2.3 | 87 |
| 2 | 0.6 | 0.34 | 0.23 | 24.3 | 1.3 | 85 |
| 3 | 0.6 | 0.48 | 0.18 | 28.1 | 1.2 | 86 |

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A process for producing a synthesis gas comprising a mixture of $H_2$ and CO wherein the $H_2$ to CO mole ratio is less than 2 to 1, which comprises partially oxidizing and steam reforming a feed comprising a hydrocarbon, $CO_2$, $O_2$ and $H_2O$, wherein said partial oxidation and reforming both occur in the presence of a Group VIII non-noble metal steam reforming catalyst resulting in net $CO_2$ conversion wherein said catalyst exhibits a deactivation rate of less than 1 mole % of hydrocarbon conversion per day and wherein the mole ratio of said $CO_2$ plus $H_2O$ to the carbon in said feed hydrocarbon ranges from 0.5–2.5, wherein the mole ratio of said $H_2O$ to said $CO_2$ ranges from 0.35 to 0.8 and wherein the mole ratio of said $H_2O$ to said carbon in said feed hydrocarbon is less than 0.5.

2. A process according to claim 1 wherein said catalyst is present as a fluidized bed of catalyst.

3. A process according to claim 2 wherein said feed $H_2O$ to total feed hydrocarbon carbon mole ratio is no greater than 0.23.

4. A process according to claim 3 wherein a particulate heat transfer material is present in said bed.

5. A process according to claim 4 wherein said catalyst comprises a supported nickel catalytic component.

6. A process according to claim 2 wherein said catalyst exhibits a deactivation rate of less than 1 mole % of hydrocarbon conversion per day.

7. A process according to claim 5 wherein said feed $H_2O$ to total feed hydrocarbon carbon mole ratio is less than 0.23.

8. A fluidized bed synthesis gas generation process for producing a synthesis gas comprising a mixture of $H_2$ and CO in which the $H_2$ to CO mole ratio is less than 2:1, which comprises partially oxidizing and steam reforming a feed comprising a natural gas containing a hydrocarbon, $CO_2$, $O_2$ and $H_2O$, wherein said partial oxidation and reforming both occur in the presence of a steam reforming catalyst comprising a catalytic nickel component supported on a support material resulting in net $CO_2$ conversion wherein said catalyst exhibits a deactivation rate of less than 1 mole % of hydrocarbon conversion per day and wherein the mole ratio of said feed $CO_2$ plus $H_2O$ to the carbon in said feed hydrocarbon ranges from 0.5–2.5, wherein the mole ratio of said $H_2O$ to said $CO_2$ in said feed ranges from 0.35 to 0.8 and wherein the mole ratio of said feed $H_2O$ to said carbon in said feed hydrocarbon is less than 5.0.

9. A process according to claim 8 wherein said feed hydrocarbon comprises mostly methane.

10. A process according to claim 9 wherein a particulate heat transfer material is also present during said partial oxidation and steam reforming.

11. A process according to claim 10 wherein said feed $H_2O$ to total feed hydrocarbon carbon mole ratio is no greater than 0.23.

12. A process according to claim 11 wherein said feed $H_2O$ to total feed hydrocarbon carbon mole ratio is less than 0.23.

* * * * *